United States Patent
Donovan et al.

(10) Patent No.: US 11,833,913 B2
(45) Date of Patent: Dec. 5, 2023

(54) SYSTEM AND METHOD FOR DISCONNECTING A BATTERY ASSEMBLY FROM AN ELECTRIC AIRCRAFT

(71) Applicant: BETA AIR, LLC, South Burlington, VT (US)

(72) Inventors: Sean Richard Donovan, Richmond, VT (US); Nathan William Joseph Wiegman, Essex Junction, VT (US); Tom Michael Hughes, Bristol, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/373,389

(22) Filed: Jul. 12, 2021

(65) Prior Publication Data

US 2023/0010413 A1 Jan. 12, 2023

(51) Int. Cl.
*B60L 50/60* (2019.01)
*B64D 27/24* (2006.01)
*B60L 58/10* (2019.01)
*B64D 45/00* (2006.01)
*B64C 29/00* (2006.01)

(52) U.S. Cl.
CPC ............... *B60L 50/60* (2019.02); *B60L 58/10* (2019.02); *B64C 29/00* (2013.01); *B64D 27/24* (2013.01); *B64D 45/00* (2013.01); *B60L 2200/10* (2013.01); *B64D 2045/0085* (2013.01)

(58) Field of Classification Search
None
See application file for complete search history.

(56) References Cited

U.S. PATENT DOCUMENTS

| 4,798,968 A | | 1/1989 | Deem | |
|---|---|---|---|---|
| 5,163,537 A | * | 11/1992 | Radev | ..................... B60L 50/60 180/65.1 |

(Continued)

FOREIGN PATENT DOCUMENTS

| WO | 2008076040 | | 6/2008 | |
|---|---|---|---|---|
| WO | WO-2016169515 A1 | * | 10/2016 | .............. B60L 50/60 |
| WO | 2018012768 | | 1/2018 | |

*Primary Examiner* — Tien Q Dinh
*Assistant Examiner* — William L Gmoser
(74) *Attorney, Agent, or Firm* — CALDWELL INTELLECTUAL PROPERTY LAW

(57) ABSTRACT

A system for disconnecting a battery from an electric aircraft upon impact. The system includes an electric aircraft and a battery assembly electrically coupled to the electric aircraft. The battery assembly is configured to include at least a sensor. The at least a sensor is configured to detect impacts to the electric aircraft. The battery assembly is configured to include a connector. The connector attaches the battery assembly to the electric aircraft. The connector includes an electrically actuating disconnection mechanism. The battery assembly is configured to include a control circuit. The control circuit is electrically connected to the electrically actuating disconnection mechanism. The control circuit is configured to detect, using the at least a sensor, an impact to the aircraft. The control sensor disconnects the connector from the electric aircraft using the electrically actuating disconnection mechanism as a function of the detection of impacts to the electric aircraft.

20 Claims, 9 Drawing Sheets

(56) References Cited

U.S. PATENT DOCUMENTS

| | | | |
|---|---|---|---|
| 5,928,300 | A | 7/1999 | Rogers et al. |
| 6,049,140 | A | 4/2000 | Alksnat et al. |
| 6,087,737 | A | 7/2000 | Alksnat et al. |
| 6,299,102 | B2 | 10/2001 | Happ |
| 7,339,774 | B2 | 3/2008 | Zdziech et al. |
| 9,221,343 | B2 | 12/2015 | Tokarz et al. |
| 10,680,451 | B2 | 6/2020 | Ikeyama |
| 10,737,576 | B2 | 8/2020 | Ortner et al. |
| 10,755,492 | B2 | 8/2020 | Light-Holets |
| 10,919,463 | B1* | 2/2021 | Brown .................. B62D 11/04 |
| 2013/0307327 | A1* | 11/2013 | Auguet ............... H02J 7/00308 |
| | | | 307/10.1 |
| 2015/0053492 | A1* | 2/2015 | Kolatschek .............. B60K 1/04 |
| | | | 180/68.5 |
| 2018/0105041 | A1* | 4/2018 | Ortner .................. B60L 3/0007 |
| 2019/0263265 | A1 | 8/2019 | Ferenczi et al. |
| 2019/0288345 | A1 | 9/2019 | Hinterberger et al. |
| 2019/0339334 | A1* | 11/2019 | Mikolajczak ........ G01R 31/392 |
| 2020/0115055 | A1* | 4/2020 | Kuperman ............ B64C 39/024 |
| 2020/0339276 | A1* | 10/2020 | Chengalva ............. B64D 45/00 |
| 2020/0354078 | A1 | 11/2020 | Brooks et al. |
| 2021/0276429 | A1* | 9/2021 | Kim ..................... B60L 3/0007 |
| 2021/0403168 | A1* | 12/2021 | Parsons ................. B64D 27/02 |
| 2022/0267017 | A1* | 8/2022 | Pitre .................. B64C 29/0016 |

* cited by examiner

SYSTEM AND METHOD FOR DISCONNECTING A BATTERY ASSEMBLY FROM AN ELECTRIC AIRCRAFT

FIELD OF THE INVENTION

The present invention generally relates to the field of electric aircraft. In particular, the present invention is directed to a system and method for disconnecting a battery assembly of an electric aircraft in the event of impact.

BACKGROUND

Modern electric aircraft, such as vertical landing and takeoff aircraft (eVTOL) may have a battery assembly. A battery assembly may be damaged upon impact to the electric aircraft, which may in turn cause dangerous conditions within the rest of the aircraft.

SUMMARY OF THE DISCLOSURE

In an aspect, a system for disconnecting a battery from an electric aircraft upon impact is disclosed. The system includes an electric aircraft and a battery assembly electrically coupled to the electric aircraft. The battery assembly is configured to include at least a sensor. The at least a sensor is configured to detect impacts to the electric aircraft. The battery assembly is configured to include a connector. The connector attaches the battery assembly to the electric aircraft. The connector includes an electrically actuating disconnection mechanism. The battery assembly is configured to include a control circuit. The control circuit is electrically connected to the electrically actuating disconnection mechanism. The control circuit is configured to detect, using the at least a sensor, an impact to the aircraft. The control sensor disconnects the connector from the electric aircraft using the electrically actuating disconnection mechanism as a function of the detection of impacts to the electric aircraft.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
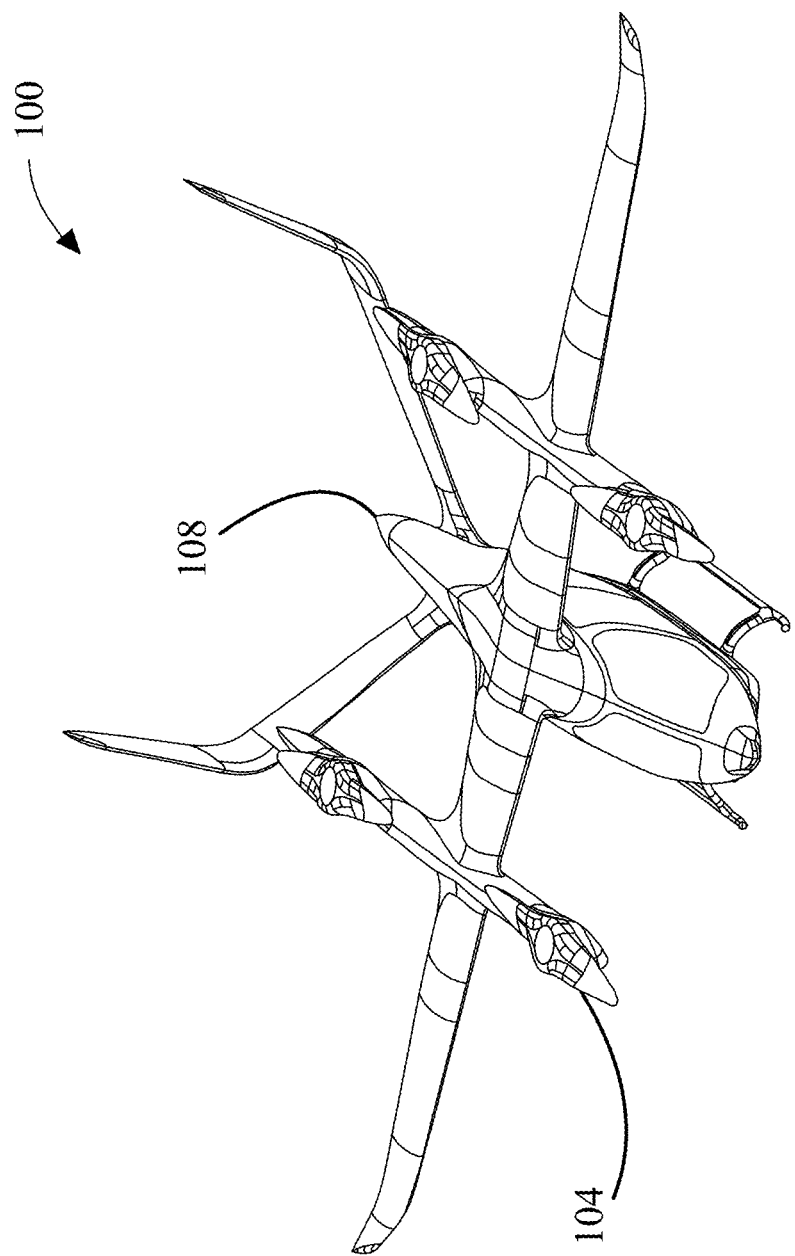
FIG. 1 is a front view of an exemplary embodiment of an electric aircraft.

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Described herein is a system for disconnecting a battery from an electric aircraft upon impact. The system may include an electric aircraft and a battery assembly. The battery assembly may be electrically coupled to the electric aircraft. The battery assembly may be configured to include at least a sensor. The at least a sensor may be configured to detect impacts to the electric aircraft. The battery assembly may include a connector. The connector may be configured to attach the battery assembly to the electric aircraft. The connector may include an electrically actuating disconnection mechanism. The battery assembly may include a control circuit. The control circuit may be electrically connected to the electrically actuating disconnection mechanism. The control circuit may be configured to detect an impact to the aircraft using the at least a sensor. The control circuit may be configured to disconnect the connector from the electric aircraft. In some embodiments, the control circuit may disconnect the connector from the electric aircraft using the electrically actuating disconnection mechanism. In some embodiments, the control circuit may disconnect the connector from the electric aircraft as a function of the detection of impacts to the electric aircraft.

Described herein is a method of disconnecting a battery assembly of an electric aircraft upon impact. In some embodiments, the method may include selecting an electric aircraft. The electric aircraft may include a battery assembly. The battery assembly may be electrically coupled to the electric aircraft. The battery assembly may be configured to include at least a sensor, a connector, and a control circuit. The at least a sensor may be configured to detect impacts to the electric aircraft. The connector may attach the battery assembly to the electric aircraft. The connector may include an electrically actuating disconnection mechanism. The method may include detecting an impact to the electric aircraft through the at least a sensor. In some embodiments, the method may include the control circuit disconnecting the connector from the electric aircraft through the electrically actuating mechanism. In some embodiments, the control circuit may disconnect the connector from the electric aircraft as a function of the detection of impacts to the electric aircraft.

Referring now to FIG. 1, an illustration of an exemplary embodiment of an electric aircraft 100 is shown. Electric aircraft 100 may include a vertical takeoff and landing aircraft (eVTOL). As used herein, a vertical take-off and landing (eVTOL) aircraft is an electrically powered aircraft that can take off and land vertically; eVTOL aircraft may be capable of hovering. In order without limitation to optimize power and energy necessary to propel an eVTOL or to increase maneuverability, the eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," helicopter, or other vehicle that maintains its lift primarily using downward thrusting propulsors. Fixed-wing flight, as described herein, flight using wings and/or foils that generate life caused by an aircraft's forward airspeed and the shape of the wings and/or foils, such as in airplane-style flight.

With continued reference to FIG. 1, a number of aerodynamic forces may act upon electric aircraft 100 during flight. Forces acting on an electric aircraft 100 during flight may include, without limitation, thrust, a forward force produced by a propulsor of electric aircraft 100, which may act parallel to a longitudinal axis of the aircraft. Another force acting upon electric aircraft 100 may include, without limitation, drag, defined as a rearward retarding force which is caused by disruption of airflow by any protruding surface of electric aircraft 100 such as, without limitation, a wing, rotor, and/or fuselage. Drag may oppose thrust and act rearward parallel to relative wind. A further force acting upon electric aircraft 100 may include, without limitation, weight, which may include a combined load of the electric aircraft 100 itself, crew, baggage, and/or fuel. Weight may pull electric aircraft 100 downward due to the force of gravity. An additional force acting on electric aircraft 100 may include, without limitation, lift, which may act to oppose the downward force of weight and may be produced by a dynamic effect of air acting on an airfoil and/or downward thrust from a propulsor of the electric aircraft. Lift generated by an airfoil may depend on speed of airflow, density of air, total area of the airfoil and/or a segment thereof, and/or an angle of attack between air and the airfoil. In a non-limiting example, electric aircraft 100 may be designed to be as lightweight as possible. Reducing weight of an aircraft and designing to reduce a number of components may optimize weight. To save energy, it may be useful to reduce weight of components of an electric aircraft 100, including without limitation propulsors and/or propulsion assemblies.

Referring still to FIG. 1, electric aircraft 100 may include at least a vertical propulsor 104 and at least a forward propulsor 108. At least a forward propulsor 108 as used in this disclosure is a propulsor positioned for propelling an aircraft in a "forward" direction; at least a forward propulsor may include one or more propulsors mounted on the front, on the wings, at the rear, or a combination of any such positions. At least a forward propulsor may propel an aircraft forward for fixed-wing and/or "airplane"-style flight, take-off, and/or landing, and/or may propel the aircraft forward or backward on the ground. At least a vertical propulsor 104 and at least a forward propulsor 108 includes a thrust element. At least a thrust element may include any device or component that converts the mechanical energy of a motor, for instance in the form of rotational motion of a shaft, into thrust in a fluid medium. At least a thrust element may include, without limitation, a device using moving or rotating foils, including without limitation one or more rotors, an airscrew or propeller, a set of airscrews or propellers such as contrarotating propellers, a moving or flapping wing, or the like. At least a thrust element may include without limitation a marine propeller or screw, an impeller, a turbine, a pump-jet, a paddle or paddle-based device, or the like. As another non-limiting example, at least a thrust element may include an eight-bladed pusher propeller, such as an eight-bladed propeller mounted behind the engine to ensure the drive shaft is in compression. Propulsors may include at least a motor mechanically coupled to the at least a first propulsor as a source of thrust. A motor may include without limitation, any electric motor, where an electric motor is a device that converts electrical energy into mechanical energy, for instance by causing a shaft to rotate. At least a motor may be driven by direct current (DC) electric power; for instance, at least a first motor may include a brushed DC at least a first motor, or the like. At least a first motor may be driven by electric power having varying or reversing voltage levels, such as alternating current (AC) power as produced by an alternating current generator and/or inverter, or otherwise varying power, such as produced by a switching power source. At least a first motor may include, without limitation, brushless DC electric motors, permanent magnet synchronous at least a first motor, switched reluctance motors, or induction motors. In addition to inverter and/or a switching power source, a circuit driving at least a first motor may include electronic speed controllers or other components for regulating motor speed, rotation direction, and/or dynamic braking. Persons skilled in the art, upon reviewing the entirety of this disclosure, will be aware of various devices that may be used as at least a thrust element.

With continued reference to FIG. 1, a "vertical propulsor" as used in this disclosure is a propulsor that propels an aircraft in an upward direction; one or more vertical propulsors may be mounted on the front, on the wings, at the rear, and/or any suitable location. A "propulsor," as used in this disclosure, is a component or device used to propel a craft by exerting force on a fluid medium, which may include a gaseous medium such as air or a liquid medium such as water. At least a vertical propulsor 104 may generate a substantially downward thrust, tending to propel an aircraft in a vertical direction providing thrust for maneuvers such as without limitation, vertical take-off, vertical landing, hovering, and/or rotor-based flight such as "quadcopter" or similar styles of flight.

Figure 2:
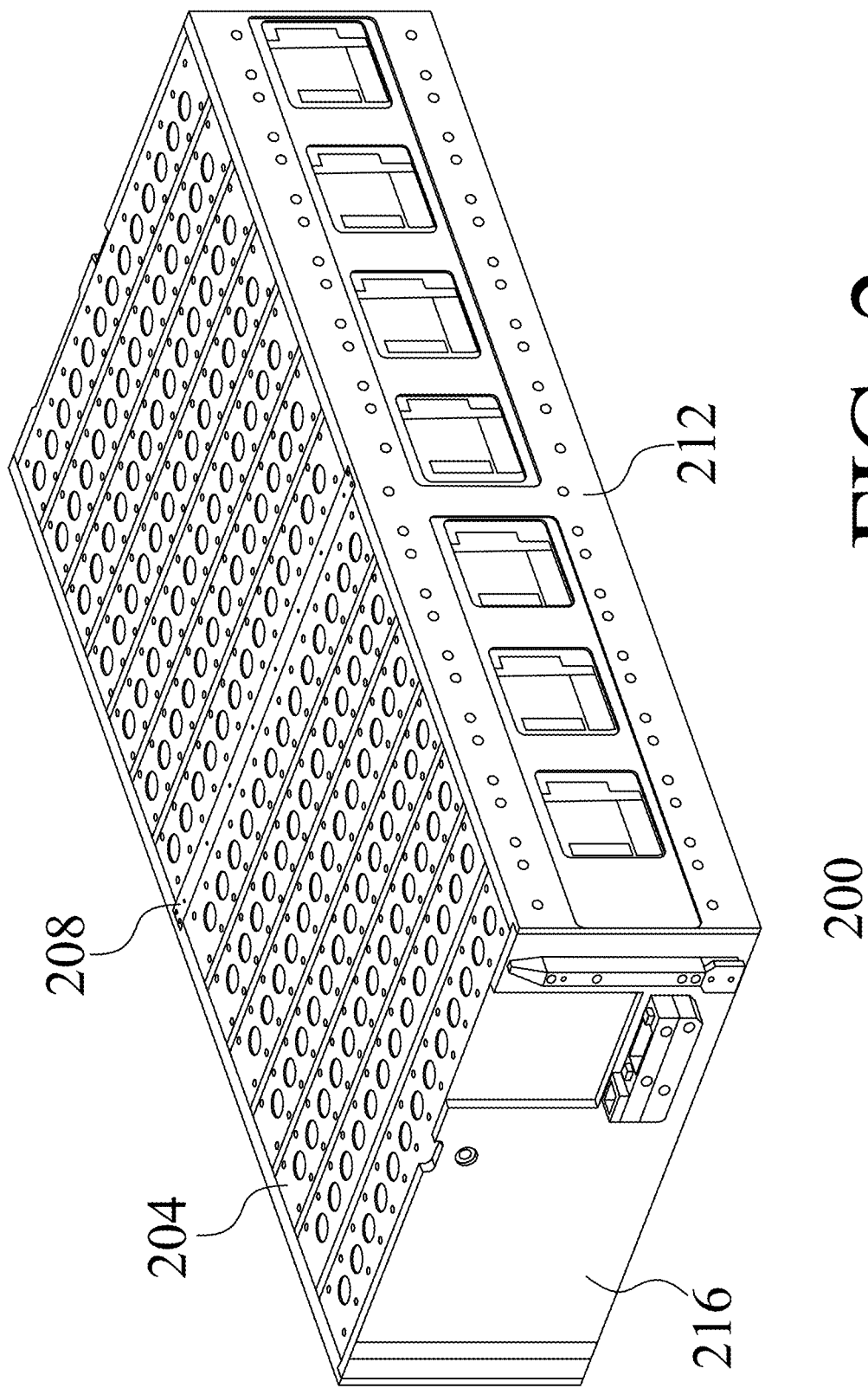
FIG. 2 is a front view of an exemplary embodiment of a battery pack.

FIG. 2 illustrates an exemplary embodiment of a battery pack 200 that may be housed in the electric aircraft to provide power to the electric aircraft. Battery pack 200 may be a power storing device that is configured to store electrical energy in the form of a plurality of battery modules, which themselves may be comprised of a plurality of electrochemical cells. These cells may utilize electrochemical cells, galvanic cells, electrolytic cells, fuel cells, flow cells, and/or voltaic cells. In general, an electrochemical cell is a device capable of generating electrical energy from chemical reactions or using electrical energy to cause chemical reactions. Voltaic or galvanic cells are electrochemical cells that generate electric current from chemical reactions, while electrolytic cells generate chemical reactions via electrolysis. In general, the term 'battery' is used as a collection of cells connected in series or parallel to each other. A battery cell may, when used in conjunction with other cells, be electrically connected in series, in parallel or a combination of series and parallel. Series connection comprises wiring a first terminal of a first cell to a second terminal of a second cell and further configured to comprise a single conductive path for electricity to flow while maintaining the same current (measured in Amperes) through any component in the circuit. A battery cell may use the term 'wired', but one of ordinary skill in the art would appreciate that this term is synonymous with 'electrically connected', and that there are many ways to couple electrical elements like battery cells together. An example of a connector that does not comprise wires may include prefabricated terminals of a first gender that mate with a second terminal with a second gender. Battery cells may be wired in parallel. Parallel connection comprises wiring a first and second terminal of a first battery cell to a first and second terminal of a second battery cell and further configured to comprise more than one conductive path for electricity to flow while maintaining the same voltage (measured in Volts) across any component in the circuit. Battery cells may be wired in a series-parallel circuit which combines characteristics of the constituent circuit types to this combination circuit. Battery cells may be electrically connected in a virtually unlimited arrangement which may confer onto the system the electrical advantages associated with that arrangement such as high-voltage applications, high-current applications, or the like. In an exemplary embodiment, battery pack 200 may include at least 196 battery cells in series and at least 18 battery cells in parallel. This is, as someone of ordinary skill in the art would appreciate, only an example and battery pack 200 may be configured to have a near limitless arrangement of battery cell configurations.

With continued reference to FIG. 2, battery pack 200 may include a plurality of battery modules 204. The battery modules may be wired together in series and in parallel. Battery pack 200 may include a center sheet 208 which may include a thin barrier. The barrier may include a fuse connecting battery modules on either side of center sheet 208. The fuse may be disposed in or on center sheet 208 and configured to connect to an electric circuit comprising a first battery module and therefore battery unit and cells. In general, and for the purposes of this disclosure, a fuse is an electrical safety device that operate to provide overcurrent protection of an electrical circuit. As a sacrificial device, its essential component is metal wire or strip that melts when too much current flows through it, thereby interrupting energy flow. The fuse may comprise a thermal fuse, mechanical fuse, blade fuse, expulsion fuse, spark gap surge arrestor, varistor, or a combination thereof.

Battery pack 200 may also include a side wall 212 which may include a laminate of a plurality of layers configured to thermally insulate the plurality of battery modules 204 from external components of battery pack 200. Side wall 212 layers may include materials which possess characteristics suitable for thermal insulation such as fiberglass, air, iron fibers, polystyrene foam, and thin plastic films. Side wall 212 may additionally or alternatively electrically insulate the plurality of battery modules 204 from external components of battery pack 200 and the layers of which may include polyvinyl chloride (PVC), glass, asbestos, rigid laminate, varnish, resin, paper, Teflon, rubber, and mechanical lamina. Center sheet 208 may be mechanically coupled to side wall 212. Side wall 212 may include a feature for alignment and coupling to center sheet 208. This feature may comprise a cutout, slots, holes, bosses, ridges, channels, and/or other undisclosed mechanical features, alone or in combination.

Battery pack 200 may also include an end panel 216 having a plurality of electrical connectors and further configured to fix battery pack 200 in alignment with at least a side wall 212. End panel 216 may include a plurality of electrical connectors of a first gender configured to electrically and mechanically couple to electrical connectors of a second gender. End panel 216 may be configured to convey electrical energy from battery cells to at least a portion of an eVTOL aircraft. Electrical energy may be configured to power at least a portion of an eVTOL aircraft or comprise signals to notify aircraft computers, personnel, users, pilots, and any others of information regarding battery health, emergencies, and/or electrical characteristics. The plurality of electrical connectors may comprise blind mate connectors, plug and socket connectors, screw terminals, ring and spade connectors, blade connectors, and/or an undisclosed type alone or in combination. The electrical connectors of which end panel 216 comprises may be configured for power and communication purposes.

Figure 3:
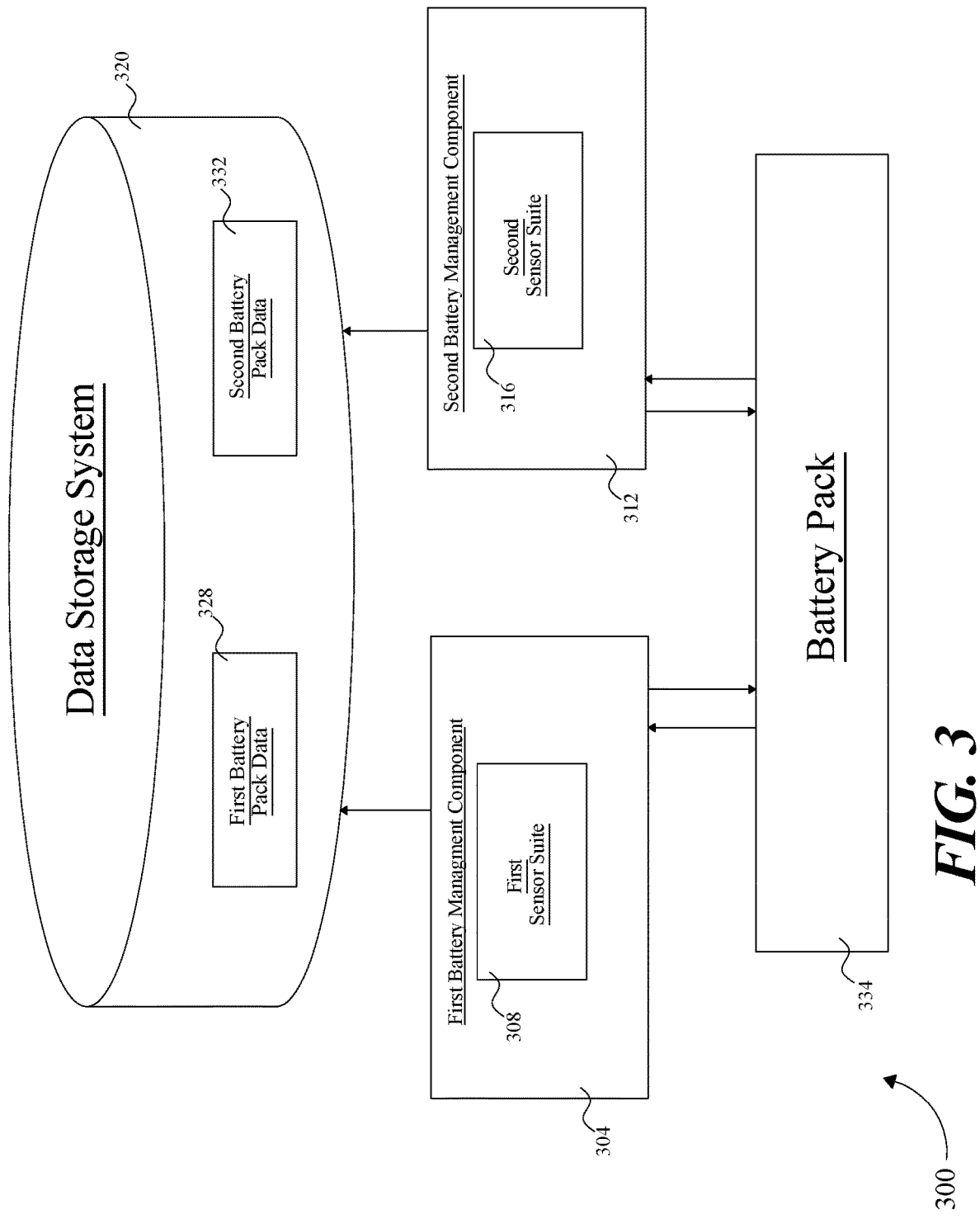
FIG. 3 is a block diagram of an exemplary embodiment of a battery management system.

Referring now to FIG. 3, an embodiment of battery management system 300 is presented. Battery management system 300 may be integrated in a battery pack configured for use in an electric aircraft. The battery management system 300 may be integrated in a portion of the battery pack or subassembly thereof. Battery management system 300 includes first battery management component 304 disposed on a first end of the battery pack. One of ordinary skill in the art will appreciate that there are various areas in and on a battery pack and/or subassemblies thereof that may include first battery management component 304. First battery management component 304 may take any suitable form. In a non-limiting embodiment, first battery management component 304 may include a circuit board, such as a printed circuit board and/or integrated circuit board, a subassembly mechanically coupled to at least a portion of the battery pack, standalone components communicatively coupled together, or another undisclosed arrangement of components; for instance, and without limitation, a number of components of first battery management component 304 may be soldered or otherwise electrically connected to a circuit board. First battery management component may be disposed directly over, adjacent to, facing, and/or near a battery module and specifically at least a portion of a battery cell. First battery management component 304 includes first sensor suite 308. First sensor suite 308 is configured to measure, detect, sense, and transmit first plurality of battery pack data 328 to data storage system 320, which will be disclosed in further detail with reference to FIG. 3.

Referring again to FIG. 3, battery management system 300 may include second battery management component 312. Second battery management component 312 may be disposed in or on a second end of battery pack 334. Second battery management component 312 may include second sensor suite 316. Second sensor suite 316 may be consistent with the description of any sensor suite disclosed herein. Second sensor suite 316 may be configured to measure second plurality of battery pack data 332. Second plurality of battery pack data 332 may be consistent with the description of any battery pack data disclosed herein. Second plurality of battery pack data 332 may additionally or alternatively include data not measured or recorded in another section of battery management system 300. Second plurality of battery pack data 332 may be communicated to additional or alternate systems to which it is communicatively coupled. Second sensor suite 316 includes a humidity sensor consistent with any humidity sensor disclosed herein.

With continued reference to FIG. 3, first battery management component 304 disposed in or on battery pack 334 may be physically isolated from second battery management component 312 also disposed on or in battery pack 334. "Physical isolation", for the purposes of this disclosure, refer to a first system's components, communicative coupling, and any other constituent parts, whether software or hardware, are separated from a second system's components, communicative coupling, and any other constituent parts, whether software or hardware, respectively. First battery management component 304 and second battery management component 308 may perform the same or different functions in battery management system 300. In a non-limiting embodiment, the first and second battery management components perform the same, and therefore redundant functions. If, for example, first battery management component 304 malfunctions, in whole or in part, second battery management component 308 may still be operating properly and therefore battery management system 300 may still operate and function properly for electric aircraft in which it is installed. Additionally, or alternatively, second battery management component 308 may power on while first battery management component 304 is malfunctioning. One of ordinary skill in the art would understand that the terms "first" and "second" do not refer to either "battery management components" as primary or secondary. In non-limiting embodiments, first battery management component 304 and second battery management component 308 may be powered on and operate through the same ground operations of an electric aircraft and through the same flight envelope of an electric aircraft. This does not preclude one battery management component, first battery management component 304, from taking over for second battery management component 308 if it were to malfunction. In non-limiting embodiments, the first and second battery management components, due to their physical isolation, may be configured to withstand malfunctions or failures in the other system and survive and operate. Provisions may be made to shield first battery management component 304 from second battery management component 308 other than physical location such as structures and circuit fuses. In non-limiting embodiments, first battery management component 304, second battery management component 308, or subcomponents thereof may be disposed on an internal component or set of components within battery pack 334.

Referring again to FIG. 3, first battery management component 304 is electrically isolated from second battery management component 308. "Electrical isolation", for the purposes of this disclosure, refer to a first system's separation of components carrying electrical signals or electrical energy from a second system's components. First battery management component 304 may suffer an electrical catastrophe, rendering it inoperable, and due to electrical isolation, second battery management component 308 may still continue to operate and function normally, managing the battery pack of an electric aircraft. Shielding such as structural components, material selection, a combination thereof, or another undisclosed method of electrical isolation and insulation may be used, in non-limiting embodiments. For example, a rubber or other electrically insulating material component may be disposed between the electrical components of the first and second battery management components preventing electrical energy to be conducted through it, isolating the first and second battery management components from each other.

With continued reference to FIG. 3, battery management system 300 includes data storage system 320. Data storage system 320 is configured to store first plurality of battery pack data 328 and second plurality of battery pack data 332. Data storage system 320 may include a database. Data storage system 320 may include a solid-state memory or tape hard drive. Data storage system 320 is communicatively coupled to first battery management component 304 and second battery management component 312 and configured to receive electrical signals related to physical or electrical phenomenon measured and store those electrical signals as first battery pack data 328 and second battery pack data 332, respectively. Alternatively, data storage system 320 may include more than one discrete data storage systems that are physically and electrically isolated from each other. In this non-limiting embodiment, each of first battery management component 304 and second battery management component 312 may store first battery pack data 328 and second battery pack data 332 separately. One of ordinary skill in the art would understand the virtually limitless arrangements of data stores with which battery management system 300 could employ to store the first and second plurality of battery pack data.

Referring again to FIG. 3, data storage system 320 may store first plurality of battery pack data 328 and second plurality of battery pack data 332. First plurality of battery pack data 328 and second plurality of battery pack data 332 may include total flight hours battery pack 334 and or electric aircraft have been operating. The first and second plurality of battery pack data may include total energy flowed through battery pack 334. Data storage system 320 may be communicatively coupled to sensors that detect, measure and store energy in a plurality of measurements which may include current, voltage, resistance, impedance, coulombs, watts, temperature, or a combination thereof. Additionally or alternatively, data storage system 320 may be communicatively coupled to a sensor suite consistent with this disclosure to measure physical and/or electrical characteristics. Data storage system 320 may be configured to store first battery pack data 328 and second battery pack data 332 wherein at least a portion of the data includes battery pack maintenance history. Battery pack maintenance history may include mechanical failures and technician resolutions thereof, electrical failures and technician resolutions thereof. Additionally, battery pack maintenance history may include component failures such that the overall system still functions. Data storage system 320 may store the first and second battery pack data that includes an upper voltage threshold and lower voltage threshold consistent with this disclosure. First battery pack data 328 and second battery pack data 332 may include a moisture level threshold. The moisture level threshold may include an absolute, relative, and/or specific moisture level threshold.

Figure 4:
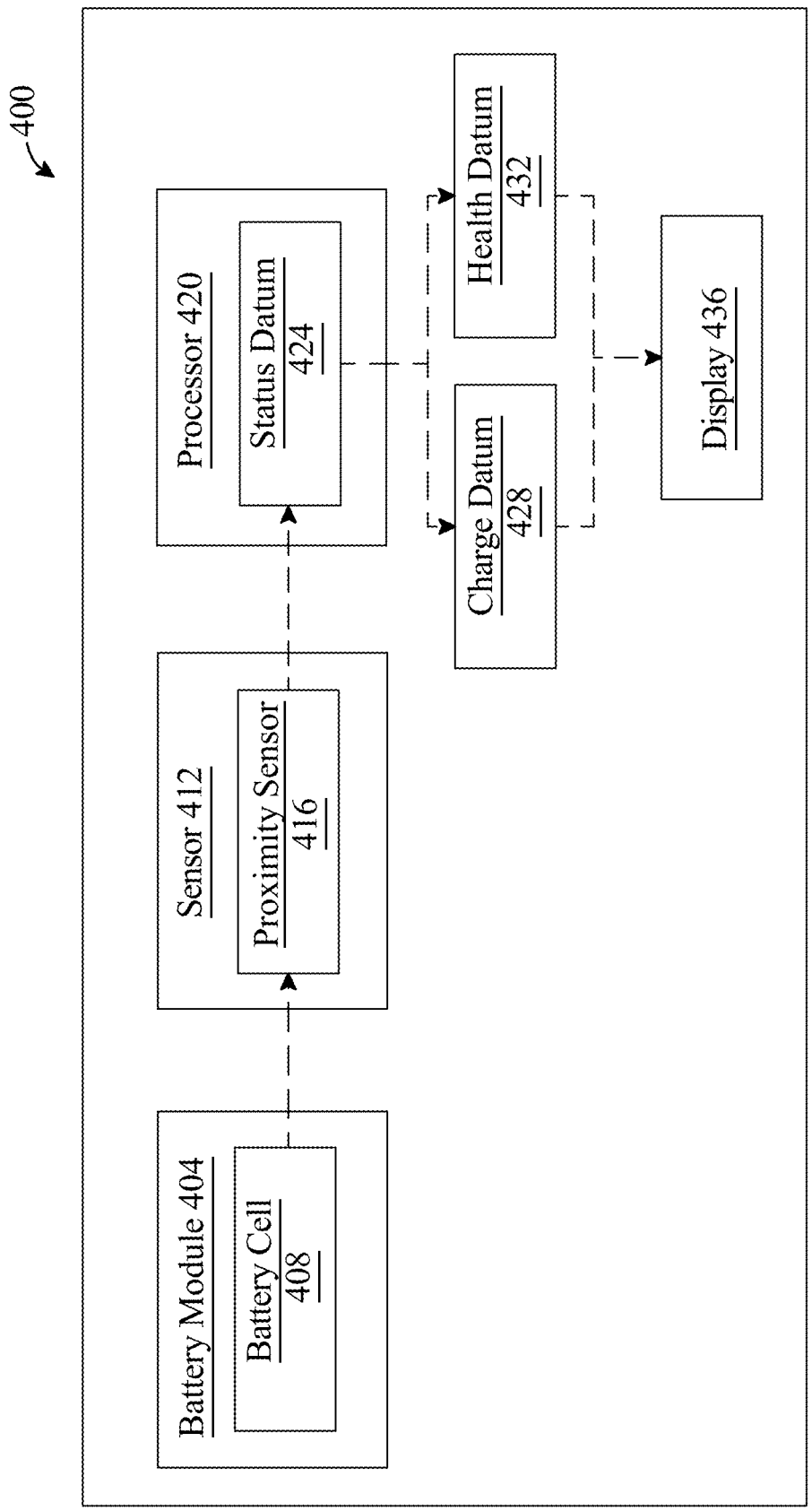
FIG. 4 is a block diagram of an exemplary embodiment of a battery health and charge monitoring system.

Referring now to FIG. 4, an exemplary embodiment of a system 400 for state determination of a battery module configured for use in an electric vehicle is illustrated. System 400 may communicate with a battery management system as described above. System 400 may send and receive data to the recharging station. In some embodiments, system 400 may send and receive data from a battery management system to optimize recharging of an electric aircraft via the recharging station. In some embodiments, system 400 may include a computing device. The computing device may include any computing device as described in this disclosure. The computing device could include, be included in, and/or share any component with any other computing device and/or system described in this disclosure. System 400 and any one or more computing devices may be designed and/or configured to perform any method, method step, or sequence of method steps in any embodiment described in this disclosure, in any order and with any degree of repetition. For instance, system 400 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. System 400 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 4, system 400 for state determination of a battery module configured for use in an electric vehicle is presented in block diagram form. System 400 may include a battery module 404. Battery module 404 may include a battery cell 408. System 400 may include sensor 412. Sensor 412 may include proximity sensor 416. System 400 may include processor 420. Processor 420 may include status datum 424. Status datum 424 may be configured to communicate with charge datum 428 and health datum 432. Processor 420 may be configured to output data on display 436. Additional disclosure related to systems for state determination of a battery module may be found in co-owned U.S. patent application entitled "SYSTEM AND METHOD FOR STATE DETERMINATION OF A BATTERY MODULE CONFIGURED FOR USED IN AN ELECTRIC VEHICLE", having U.S. patent application Ser. No. 17/241,396, the entirety of which is incorporated herein by reference.

Figure 5:
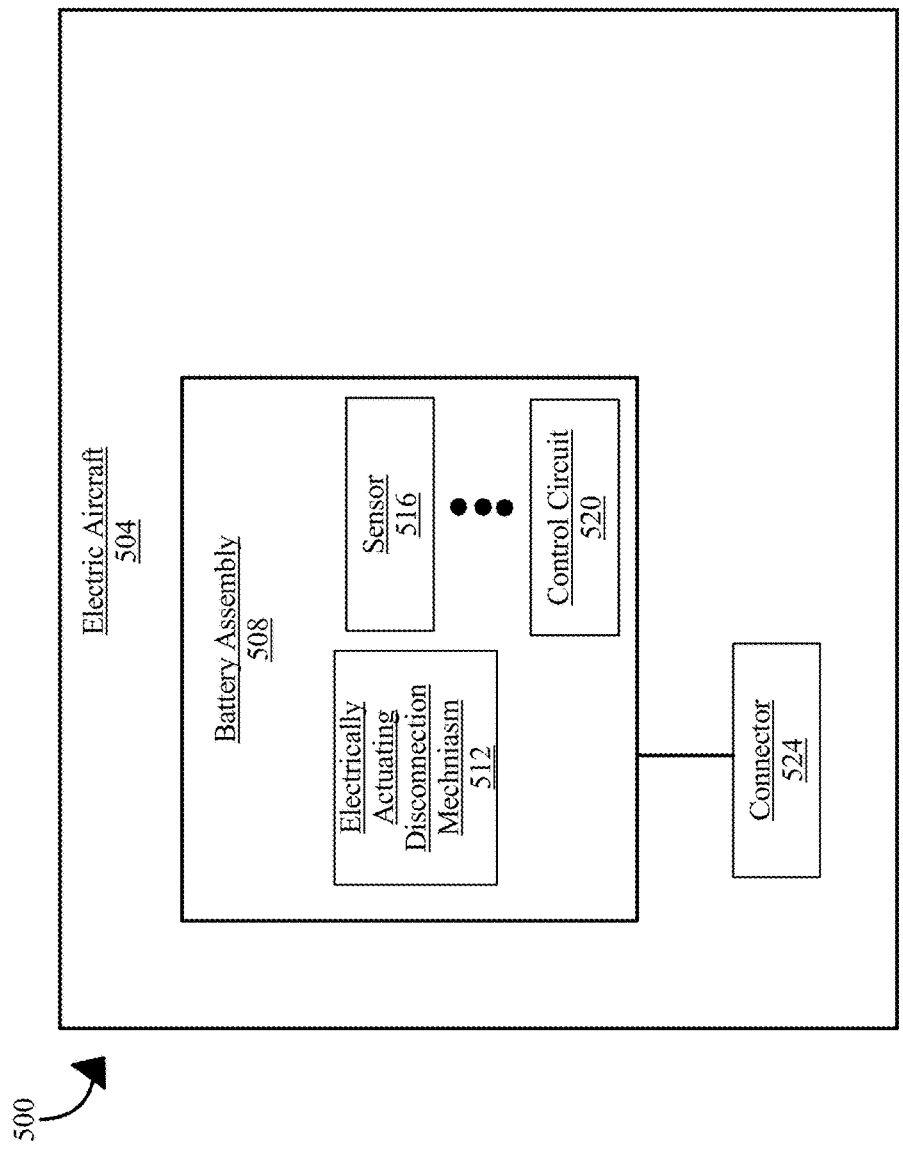
FIG. 5 is a block diagram of an exemplary embodiment of system for disconnecting a battery assembly from an electric aircraft.

Now referring to FIG. 5, a block diagram of an exemplary embodiment of a system 500 for disconnecting a battery assembly from an electric aircraft is illustrated. In some embodiments, the system may include an electric aircraft 504. Electric aircraft 504 may include an eVTOL. Electric aircraft may include a battery assembly 508. Battery assembly 508 may be configured to deliver power to electric aircraft 504. In some embodiments, battery assembly 508 may include a plurality of battery cells. In some embodiments, battery assembly 508 may include the battery pack as described in FIG. 2.

In some embodiments, and with continued reference to FIG. 5, battery assembly 508 may include an electrically actuating disconnection mechanism 512. In some embodiments, battery assembly 508 may include a plurality of electrically actuating disconnection mechanisms. Electrically actuating disconnection mechanism 512 may be configured to disconnect connector 524 from battery assembly 508. In some embodiments, electrically actuating disconnection mechanism 512 may be electrically connected to connector 524. In some embodiments, electrically actuating disconnection mechanism 512 may be mechanically coupled to connector 524. Electrically actuating disconnection mechanism 512 may include a motor. A motor may include a DC motor. A DC motor may include, but is not limited to, a shunt motor, a separately excited motor, a series motor, a PMDC motor, and/or a compound motor. A motor may include an AC motor. An AC motor may include, but is not limited to, an induction motor and a synchronous motor. A motor may include, but is not limited to, a stepper motor, brushless motor, hysteresis motor, reluctance motor, and/or universal motor. In some embodiments, a motor may include an alternative electronic actuator, such as a solenoid. In some embodiments, the motor may be configured to position electrically actuating disconnection mechanism 512 in a locked position. The locked position may include a position that may couple connector 504 to electric assembly 508 through electrically actuating disconnection mechanism 512. In some embodiments, the motor may be configured to position electrically actuating disconnection mechanism 512 into an unlocked position. An unlocked position may include electrically actuating disconnection mechanism 512 in a position that may uncouple connector 524 from battery assembly 508 through electrically actuating disconnection mechanism 512. In some embodiments, electrically actuating disconnection mechanism 512 may include a pin. Electrically actuating disconnection mechanism 512 may include a plurality of pins. The pin may be positioned in a way that may support an area of battery assembly 508.

With continued reference to FIG. 5, battery assembly 508 may include a sensor 516. In some embodiments, battery assembly 508 may include a plurality of sensors. Sensor 516 may be configured to detect a measurement indicative of an event of impact. In some embodiments, sensor 516 may include an inertial measurement unit (IMU). In some embodiments, sensor 516 may include, but is not limited to, a gyroscope, proximity sensor, pressure sensor, light sensor, pitot tubes, air speed sensors, and/or other sensors, alone or in combination thereof. Sensor 516 may be configured to detect and measure a specific force on electric aircraft 504. "Specific force" as used in this disclosure may be defined as the non-gravitational force per unit mass. Specific force may be measured in $m/s^2$. Specific force may also be referred to as g-force. In some embodiments, sensor 516 may be configured to detect a linear acceleration of electric aircraft 504. In some embodiments, sensor 516 may be configured to detect a change in pitch, roll, and/or yaw of electric aircraft 504. In some embodiments, sensor 516 may be configured to detect impact events that may correlate to a cascading failure of electric aircraft 504. A cascading failure may include a failure event of a part in a system that may trigger the failure of other interconnected parts of the system. In some embodiments, sensor 516 may be configured to detect a specific threshold of force on electric aircraft 504 that may correlate to flight failure of electric aircraft 504. In some embodiments, sensor 516 may be configured to transform a measurement of force on electric aircraft 504 into analog and/or digital signals. In some embodiments, electric aircraft 504 may include a control circuit 520. In some embodiments, sensor 516 may be in communication with control circuit 520. In some embodiments, sensor 516 may be configured to transmit data to control circuit 520.

In some embodiments, and with continued reference to FIG. 5, control circuit 520 may include a plurality of electrical components such as, but not limited to, resistors, capacitors, inductors, integrated circuits, transformers, and/or other circuit components, alone or in combination. In some embodiments, control circuit 520 may be configured to determine an impending event of impact based on data from sensor 516. In some embodiments, control circuit 520 may be configured to determine a step in a sequence of an event of impact. In some embodiments, control circuit 520 may be configured to determine a cascading failure event of electric aircraft 504. In some embodiments, control circuit 520 may be electrically connected to electrically actuating disconnection mechanism 512. Control circuit 520 may be configured to send a command to electrically actuating disconnection mechanism 512 to disconnect from connector 524 to release battery assembly 508 from electric aircraft 504. In some embodiments, control circuit 520 may send a command to electrically actuating disconnection mechanism 512 to disconnect from connector 524 in a specific step of a sequence of an impact event. In some embodiments, control circuit 520 may preemptively command electrically actuating disconnection mechanism 512 to release battery assembly 508 from electric aircraft 504 based on data from sensor 516. Control circuit 520 may use artificial intelligence and/or machine learning to more accurately predict and determine an event of impact.

In some embodiments, and with continued reference to FIG. 5, electric aircraft 504 may include a connector 524. Connector 524 may be coupled to electric aircraft 504. In some embodiments, connector 524 may include a length of material that may include a curved and/or indented portion. In some embodiments, connector 524 may be configured to grab, connect, or otherwise attach battery assembly 508 to electric aircraft 504. In some embodiments, connector 524 may include a hook. In some embodiments, connector 524 may include an inflexible material. Connector 524 may include metals and/or polymers. In some embodiments, connector 524 may be configured to mechanically connect to battery assembly 508. In some embodiments, connector 524 may be mechanically connected to battery assembly 508. In some embodiments, connector 524 may be configured to electrically connect to battery assembly 508. In some embodiments, electric aircraft 504 may include a plurality of connectors. In some embodiments, the plurality of connectors may be connected to a plurality of battery assemblies. In some embodiments, connector 524 may include a latching mechanism. The latching mechanism may secure battery assembly 508 to electric aircraft 504.

Figure 6:
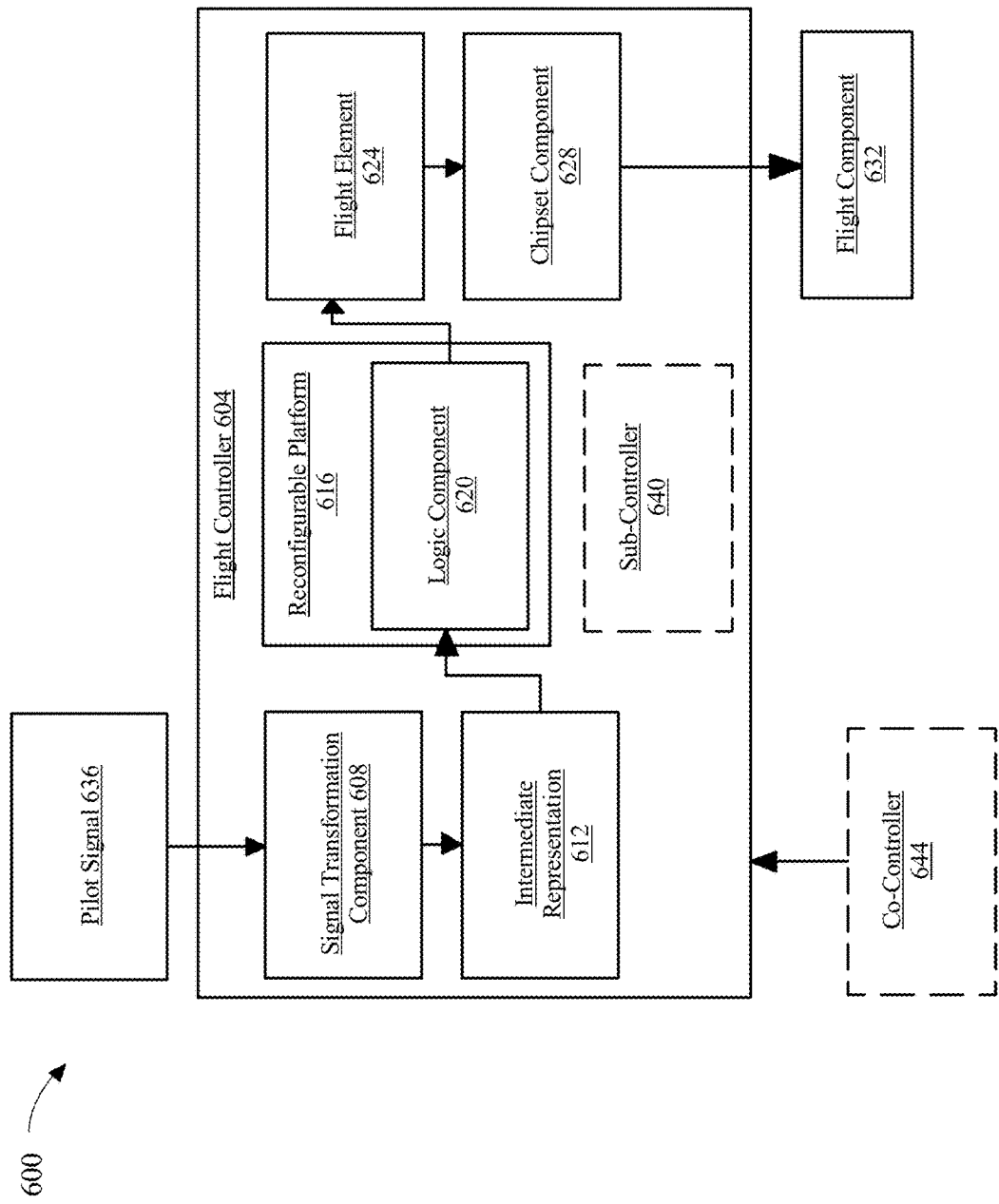
FIG. 6 is a block diagram of an exemplary embodiment of a flight controller.

Now referring to FIG. 6, an exemplary embodiment 600 of a flight controller 604 is illustrated. In some embodiments, flight controller 604 may be configured to communicate with a control circuit. In some embodiments, flight controller 604 may be configured to function as a control circuit. In some embodiments, a measurement from a sensor may be received at flight controller 604. Flight controller 604 may be configured to determine an incoming impact event and release a battery assembly. As used in this disclosure a "flight controller" is a computing device of a plurality of computing devices dedicated to data storage, security, distribution of traffic for load balancing, and flight instruction. Flight controller 604 may include and/or communicate with any computing device as described in this disclosure, including without limitation a microcontroller, microprocessor, digital signal processor (DSP) and/or system on a chip (SoC) as described in this disclosure. Further, flight controller 604 may include a single computing device operating independently, or may include two or more computing device operating in concert, in parallel, sequentially or the like; two or more computing devices may be included together in a single computing device or in two or more computing devices. In embodiments, flight controller 604 may be installed in an aircraft, may control the aircraft remotely, and/or may include an element installed in the aircraft and a remote element in communication therewith.

In an embodiment, and still referring to FIG. 6, flight controller 604 may include a signal transformation component 608. As used in this disclosure a "signal transformation component" is a component that transforms and/or converts a first signal to a second signal, wherein a signal may include one or more digital and/or analog signals. For example, and without limitation, signal transformation component 608 may be configured to perform one or more operations such as preprocessing, lexical analysis, parsing, semantic analysis, and the like thereof. In an embodiment, and without limitation, signal transformation component 608 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 608 may include transforming one or more low-level languages such as, but not limited to, machine languages and/or assembly languages. For example, and without limitation, signal transformation component 608 may include transforming a binary language signal to an assembly language signal. In an embodiment, and without limitation, signal transformation component 608 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 6, signal transformation component 608 may be configured to optimize an intermediate representation 612. As used in this disclosure an "intermediate representation" is a data structure and/or code that represents the input signal. Signal transformation component 608 may optimize intermediate representation as a function of a data-flow analysis, dependence analysis, alias analysis, pointer analysis, escape analysis, and the like thereof. In an embodiment, and without limitation, signal transformation component 608 may optimize intermediate representation 612 as a function of one or more inline expansions, dead code eliminations, constant propagation, loop transformations, and/or automatic parallelization functions. In another embodiment, signal transformation component 608 may optimize intermediate representation as a function of a machine dependent optimization such as a peephole optimization, wherein a peephole optimization may rewrite short sequences of code into more efficient sequences of code. Signal transformation component 608 may optimize intermediate representation to generate an output language, wherein an "output language," as used herein, is the native machine language of flight controller 604. For example, and without limitation, native machine language may include one or more binary and/or numerical languages.

In an embodiment, and without limitation, signal transformation component 608 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q-k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 6, flight controller 604 may include a reconfigurable hardware platform 616. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 616 may be reconfigured to enact any algorithm and/or algorithm selection process received from another computing device and/or created using machine-learning processes.

Still referring to FIG. 6, reconfigurable hardware platform 616 may include a logic component 620. As used in this disclosure a "logic component" is a component that executes instructions on output language. For example, and without limitation, logic component may perform basic arithmetic, logic, controlling, input/output operations, and the like thereof. Logic component 620 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 620 may be organized according to Von Neumann and/or Harvard architecture as a non-limiting example. Logic component 620 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC). In an embodiment, logic component 620 may include one or more integrated circuit microprocessors, which may contain one or more central processing units, central processors, and/or main processors, on a single metal-oxide-semiconductor chip. Logic component 620 may be configured to execute a sequence of stored instructions to be performed on the output language and/or intermediate representation 612. Logic component 620 may be configured to fetch and/or retrieve the instruction from a memory cache, wherein a "memory cache," as used in this disclosure, is a stored instruction set on flight controller 604. Logic component 620 may be configured to decode the instruction retrieved from the memory cache to opcodes and/or operands. Logic component 620 may be configured to execute the instruction on intermediate representation 612 and/or output language. For example, and without limitation, logic component 620 may be configured to execute an addition operation on intermediate representation 612 and/or output language.

In an embodiment, and without limitation, logic component 620 may be configured to calculate a flight element 624. As used in this disclosure a "flight element" is an element of datum denoting a relative status of aircraft. For example, and without limitation, flight element 624 may denote one or more torques, thrusts, airspeed velocities, forces, altitudes, groundspeed velocities, directions during flight, directions facing, forces, orientations, and the like thereof. For example, and without limitation, flight element 624 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 624 may denote that aircraft is following a flight path accurately and/or sufficiently.

Still referring to FIG. 6, flight controller 604 may include a chipset component 628. As used in this disclosure a "chipset component" is a component that manages data flow. In an embodiment, and without limitation, chipset component 628 may include a northbridge data flow path, wherein the northbridge dataflow path may manage data flow from logic component 620 to a high-speed device and/or component, such as a RAM, graphics controller, and the like thereof. In another embodiment, and without limitation, chipset component 628 may include a southbridge data flow path, wherein the southbridge dataflow path may manage data flow from logic component 620 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 628 may manage data flow between logic component 620, memory cache, and a flight component 632. As used in this disclosure a "flight component" is a portion of an aircraft that can be moved or adjusted to affect one or more flight elements. For example, flight component 632 may include a component used to affect the aircrafts' roll and pitch which may comprise one or more ailerons. As a further example, flight component 632 may include a rudder to control yaw of an aircraft. In an embodiment, chipset component 628 may be configured to communicate with a plurality of flight components as a function of flight element 624. For example, and without limitation, chipset component 628 may transmit to an aircraft rotor to reduce torque of a first lift propulsor and increase the forward thrust produced by a pusher component to perform a flight maneuver.

In an embodiment, and still referring to FIG. 6, flight controller 604 may be configured generate an autonomous function. As used in this disclosure an "autonomous function" is a mode and/or function of flight controller 604 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 624. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 604 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 604 will control the ailerons and/or rudders. As used in this disclosure "non-autonomous mode" is a mode that denotes a pilot will control aircraft and/or maneuvers of aircraft in its entirety.

In an embodiment, and still referring to FIG. 6, flight controller 604 may generate autonomous function as a function of an autonomous machine-learning model. As used in this disclosure an "autonomous machine-learning model" is a machine-learning model to produce an autonomous function output given flight element 624 and a pilot signal 636 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 636 may denote that a pilot is controlling and/or maneuvering ailerons, wherein the pilot is not in control of the rudders and/or propulsors. In an embodiment, pilot signal 636 may include an implicit signal and/or an explicit signal. For example, and without limitation, pilot signal 636 may include an explicit signal, wherein the pilot explicitly states there is a lack of control and/or desire for autonomous function. As a further non-limiting example, pilot signal 636 may include an explicit signal directing flight controller 604 to control and/or maintain a portion of aircraft, a portion of the flight plan, the entire aircraft, and/or the entire flight plan. As a further non-limiting example, pilot signal 636 may include an implicit signal, wherein flight controller 604 detects a lack of control such as by a malfunction, torque alteration, flight path deviation, and the like thereof. In an embodiment, and without limitation, pilot signal 636 may include one or more explicit signals to reduce torque, and/or one or more implicit signals that torque may be reduced due to reduction of airspeed velocity. In an embodiment, and without limitation, pilot signal 636 may include one or more local and/or global signals. For example, and without limitation, pilot signal 636 may include a local signal that is transmitted by a pilot and/or crew member. As a further non-limiting example, pilot signal 636 may include a global signal that is transmitted by air traffic control and/or one or more remote users that are in communication with the pilot of aircraft. In an embodiment, pilot signal 636 may be received as a function of a tri-state bus and/or multiplexor that denotes an explicit pilot signal should be transmitted prior to any implicit or global pilot signal.

Still referring to FIG. 6, autonomous machine-learning model may include one or more autonomous machine-learning processes such as supervised, unsupervised, or reinforcement machine-learning processes that flight controller 604 and/or a remote device may or may not use in the generation of autonomous function. As used in this disclosure "remote device" is an external device to flight controller 604. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 6, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 604 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 6, flight controller 604 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 604. Remote device and/or FPGA may transmit a signal, bit, datum, or parameter to flight controller 604 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 604 as a software update, firmware update, or corrected habit machine-learning model. For example, and without limitation autonomous machine learning model may utilize a neural net machine-learning process, wherein the updated machine-learning model may incorporate a gradient boosting machine-learning process.

Still referring to FIG. 6, flight controller 604 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 6, flight controller 604 may include, but is not limited to, for example, a cluster of flight controllers in a first location and a second flight controller or cluster of flight controllers in a second location. Flight controller 604 may include one or more flight controllers dedicated to data storage, security, distribution of traffic for load balancing, and the like. Flight controller 604 may be configured to distribute one or more computing tasks as described below across a plurality of flight controllers, which may operate in parallel, in series, redundantly, or in any other manner used for distribution of tasks or memory between computing devices. For example, and without limitation, flight controller 604 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Massachusetts, USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 6, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 632. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 6, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 604. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 612 and/or output language from logic component 620, wherein output language may include one or more analog-to-digital conversions, low bit rate transmissions, message encryptions, digital signals, binary signals, logic signals, analog signals, and the like thereof described above in detail.

Still referring to FIG. 6, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 6, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 6, flight controller 604 may also be implemented using a "shared nothing" architecture in which data is cached at the worker, in an embodiment, this may enable scalability of aircraft and/or computing device. Flight controller 604 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 6, flight controller may include a sub-controller 640. As used in this disclosure a "sub-controller" is a controller and/or component that is part of a distributed controller as described above; for instance, flight controller 604 may be and/or include a distributed flight controller made up of one or more sub-controllers. For example, and without limitation, sub-controller 640 may include any controllers and/or components thereof that are similar to distributed flight controller and/or flight controller as described above. Sub-controller 640 may include any component of any flight controller as described above. Sub-controller 640 may be implemented in any manner suitable for implementation of a flight controller as described above. As a further non-limiting example, sub-controller 640 may include one or more processors, logic components and/or computing devices capable of receiving, processing, and/or transmitting data across the distributed flight controller as described above. As a further non-limiting example, sub-controller 640 may include a controller that receives a signal from a first flight controller and/or first distributed flight controller component and transmits the signal to a plurality of additional sub-controllers and/or flight components.

Still referring to FIG. 6, flight controller may include a co-controller 644. As used in this disclosure a "co-controller" is a controller and/or component that joins flight controller 604 as components and/or nodes of a distributer flight controller as described above. For example, and without limitation, co-controller 644 may include one or more controllers and/or components that are similar to flight controller 604. As a further non-limiting example, co-controller 644 may include any controller and/or component that joins flight controller 604 to distributer flight controller. As a further non-limiting example, co-controller 644 may include one or more processors, logic components and/or computing devices capable of receiving, processing, and/or transmitting data to and/or from flight controller 604 to distributed flight control system. Co-controller 644 may include any component of any flight controller as described above. Co-controller 644 may be implemented in any manner suitable for implementation of a flight controller as described above.

In an embodiment, and with continued reference to FIG. 6, flight controller 604 may be designed and/or configured to perform any method, method step, or sequence of method steps in any embodiment described in this disclosure, in any order and with any degree of repetition. For instance, flight controller 604 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 7:
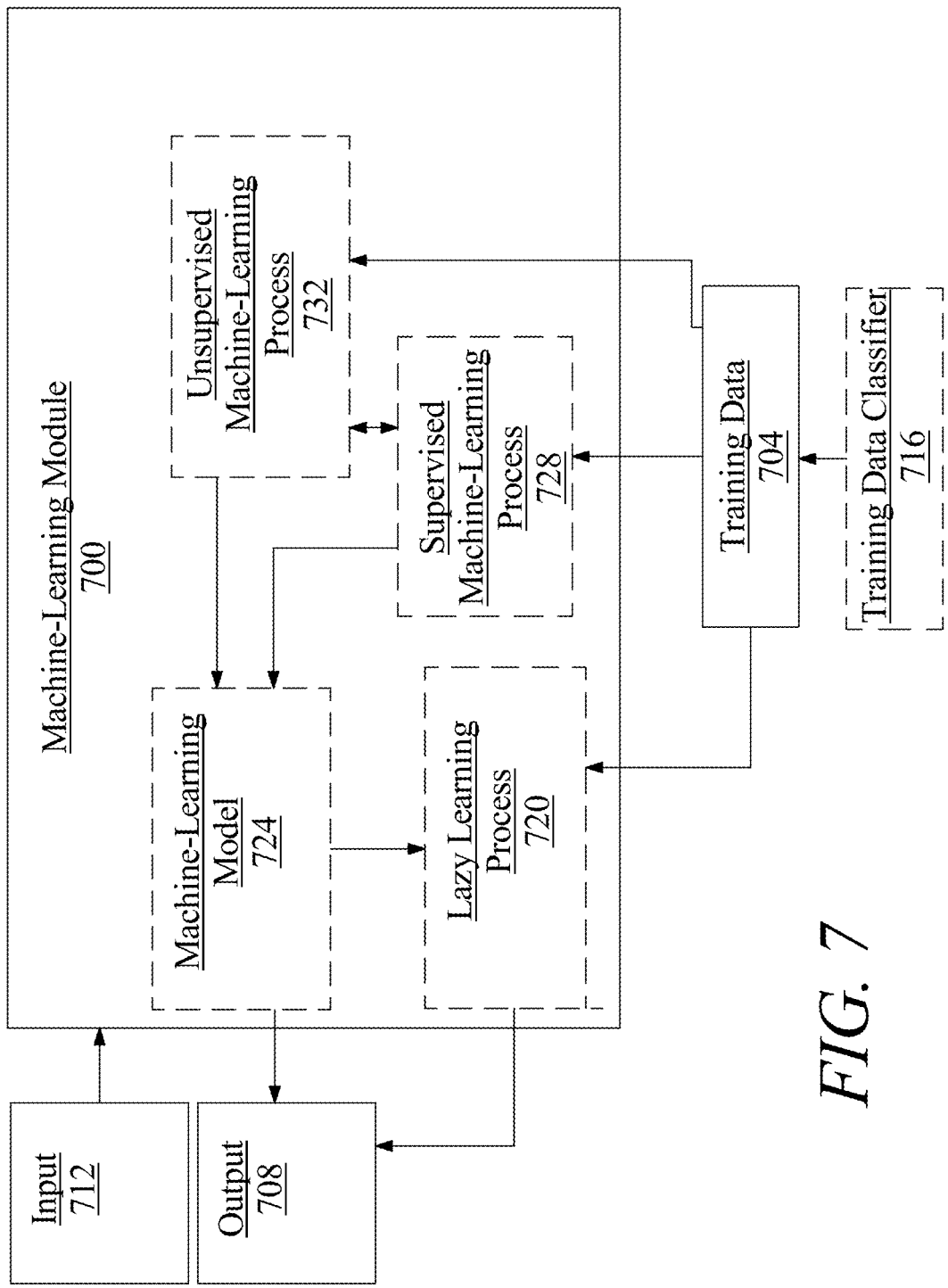
FIG. 7 is a block diagram of an exemplary embodiment of a machine learning system.

Referring now to FIG. 7, an exemplary embodiment of a machine-learning module 700 that may perform one or more machine-learning processes as described in this disclosure is illustrated. Machine-learning module 700 may be implemented in the determination of the flight states of the electric aircraft. Machine-learning module 700 may communicated with the flight controller to determine a minimal drag axis for the electric aircraft. Machine-learning module may perform determinations, classification, and/or analysis steps, methods, processes, or the like as described in this disclosure using machine learning processes. A "machine learning process," as used in this disclosure, is a process that automatedly uses training data 704 to generate an algorithm that will be performed by a computing device/module to produce outputs 708 given data provided as inputs 712; this is in contrast to a non-machine learning software program where the commands to be executed are determined in advance by a user and written in a programming language.

Still referring to FIG. 7, "training data," as used herein, is data containing correlations that a machine-learning process may use to model relationships between two or more categories of data elements. For instance, and without limitation, training data 704 may include a plurality of data entries, each entry representing a set of data elements that were recorded, received, and/or generated together; data elements may be correlated by shared existence in a given data entry, by proximity in a given data entry, or the like. Multiple data entries in training data 704 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 704 according to various correlations; correlations may indicate causative and/or predictive links between categories of data elements, which may be modeled as relationships such as mathematical relationships by machine-learning processes as described in further detail below. Training data 704 may be formatted and/or organized by categories of data elements, for instance by associating data elements with one or more descriptors corresponding to categories of data elements. As a non-limiting example, training data 704 may include data entered in standardized forms by persons or processes, such that entry of a given data element in a given field in a form may be mapped to one or more descriptors of categories. Elements in training data 704 may be linked to descriptors of categories by tags, tokens, or other data elements; for instance, and without limitation, training data 704 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 7, training data 704 may include one or more elements that are not categorized; that is, training data 704 may not be formatted or contain descriptors for some elements of data. Machine-learning algorithms and/or other processes may sort training data 704 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 704 to be made applicable for two or more distinct machine-learning algorithms as described in further detail below. Training data 704 used by machine-learning module 700 may correlate any input data as described in this disclosure to any output data as described in this disclosure. As a non-limiting illustrative example flight elements and/or pilot signals may be inputs, wherein an output may be an autonomous function.

Further referring to FIG. 7, training data may be filtered, sorted, and/or selected using one or more supervised and/or unsupervised machine-learning processes and/or models as described in further detail below; such models may include without limitation a training data classifier 716. Training data classifier 716 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 700 may generate a classifier using a classification algorithm, defined as a processes whereby a computing device and/or any module and/or component operating thereon derives a classifier from training data 704. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 716 may classify elements of training data to sub-categories of flight elements such as torques, forces, thrusts, directions, and the like thereof.

Still referring to FIG. 7, machine-learning module 700 may be configured to perform a lazy-learning process 720 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 704. Heuristic may include selecting some number of highest-ranking associations and/or training data 704 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 7, machine-learning processes as described in this disclosure may be used to generate machine-learning models 724. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 724 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 724 may be generated by creating an artificial neural network, such as a convolutional neural network comprising an input layer of nodes, one or more intermediate layers, and an output layer of nodes. Connections between nodes may be created via the process of "training" the network, in which elements from a training data 704 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 7, machine-learning algorithms may include at least a supervised machine-learning process 728.

At least a supervised machine-learning process 728, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 704. Persons skilled in the art, upon reviewing the entirety of this disclosure, will be aware of various possible variations of at least a supervised machine-learning process 728 that may be used to determine relation between inputs and outputs. Supervised machine-learning processes may include classification algorithms as defined above.

Further referring to FIG. 7, machine learning processes may include at least an unsupervised machine-learning processes 732. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 7, machine-learning module 700 may be designed and configured to create a machine-learning model 724 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 7, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 8:
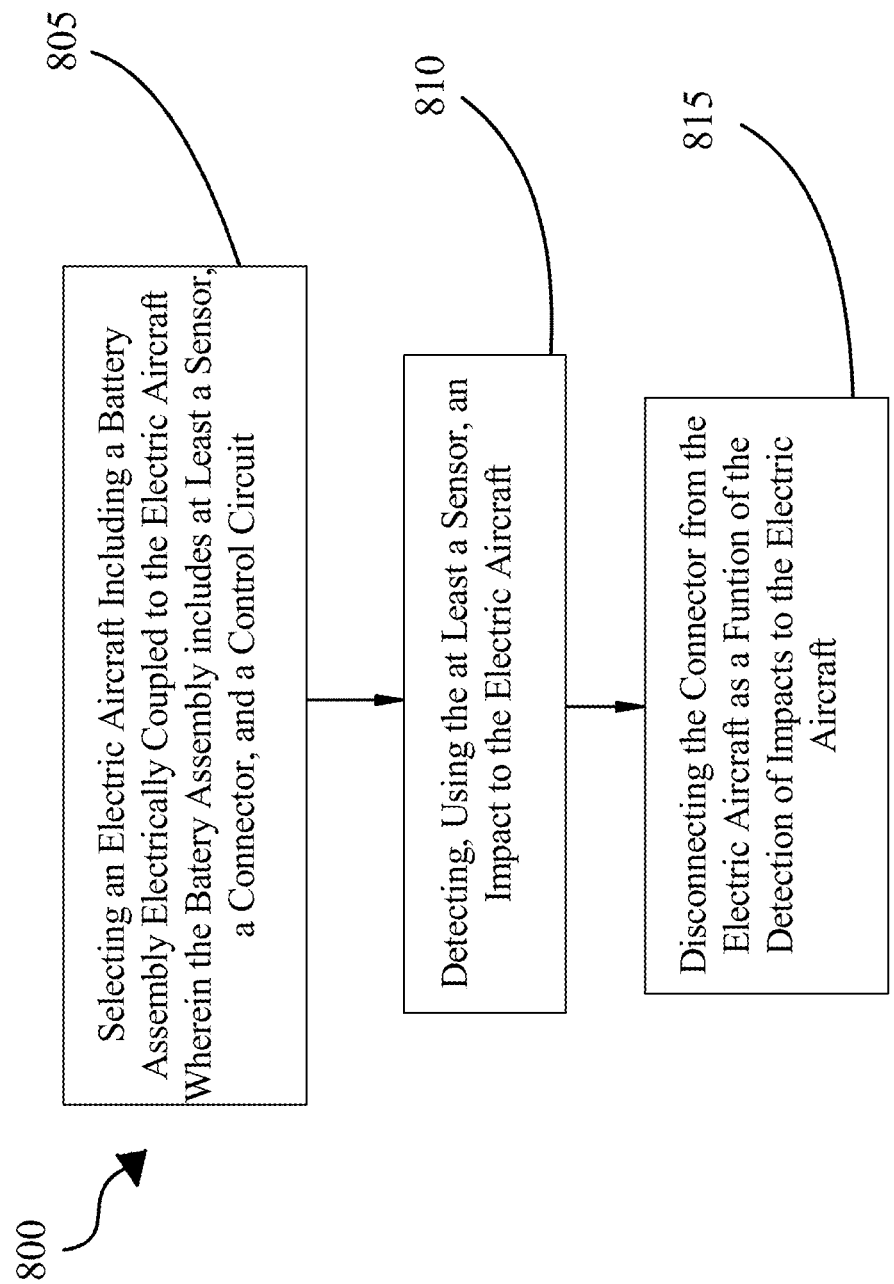
FIG. 8 is a flowchart of an exemplary embodiment of a method of disconnecting a battery assembly from an electric aircraft.

Now referring to FIG. 8, a method 800 for disconnecting a battery assembly from an electric aircraft is illustrated. At step 805, an electric aircraft including a battery assembly electrically coupled to the electric aircraft is selected. The battery assembly is configured to include at least a sensor, a connector, and a control circuit. In some embodiments, the sensor may be configured to detect impacts to the electric aircraft. The connector may be configured to attach the battery assembly to the electric aircraft. In some embodiments, the connector may include an electrically actuating disconnection mechanism. The electrically actuating disconnection mechanism may be configured to disconnect the connector from the electric assembly. The control circuit may be electrically connected to the electrically actuating disconnection mechanism. The control circuit may be in communication with the at least a sensor. In some embodiments, the control circuit may be configured to receive data from the at least a sensor.

At step 810, an impact to the electric aircraft is detected using the at least a sensor. The at least a sensor may be configured to sense a force acting upon the electric aircraft. In some embodiments, the at least a sensor may include an IMU. In some embodiments, the at least a sensor may be configured to detect a change in pitch, yaw, and/or roll of the electric aircraft. In some embodiments, the at least a sensor may be configured to detect a linear acceleration of the electric aircraft. In some embodiments, the at least a sensor may be configured to measure a specific force and convert the measurement into analog/digital signals. In some embodiments, the at least a sensor may be connected to the control circuit.

At step 815, the connector is disconnected from the electric aircraft as a function of the detection of impacts to the electric aircraft. The connector may be disconnected form the electric aircraft through the electrically actuating disconnection mechanism. The electrically actuating mechanism may be controlled from a control circuit. In some embodiments, the control circuit may process the data from the at least a sensor. In some embodiments, the control circuit may be configured to send a command to the electrically actuating mechanism to disconnect from the connector from the electric aircraft. In some embodiments, the control circuit may determine a specific threshold of impact of the electric aircraft that may trigger the release of the battery assembly. In some embodiments, the control circuit may preemptively release the battery assembly from the electric aircraft based on anticipation of an impact event.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
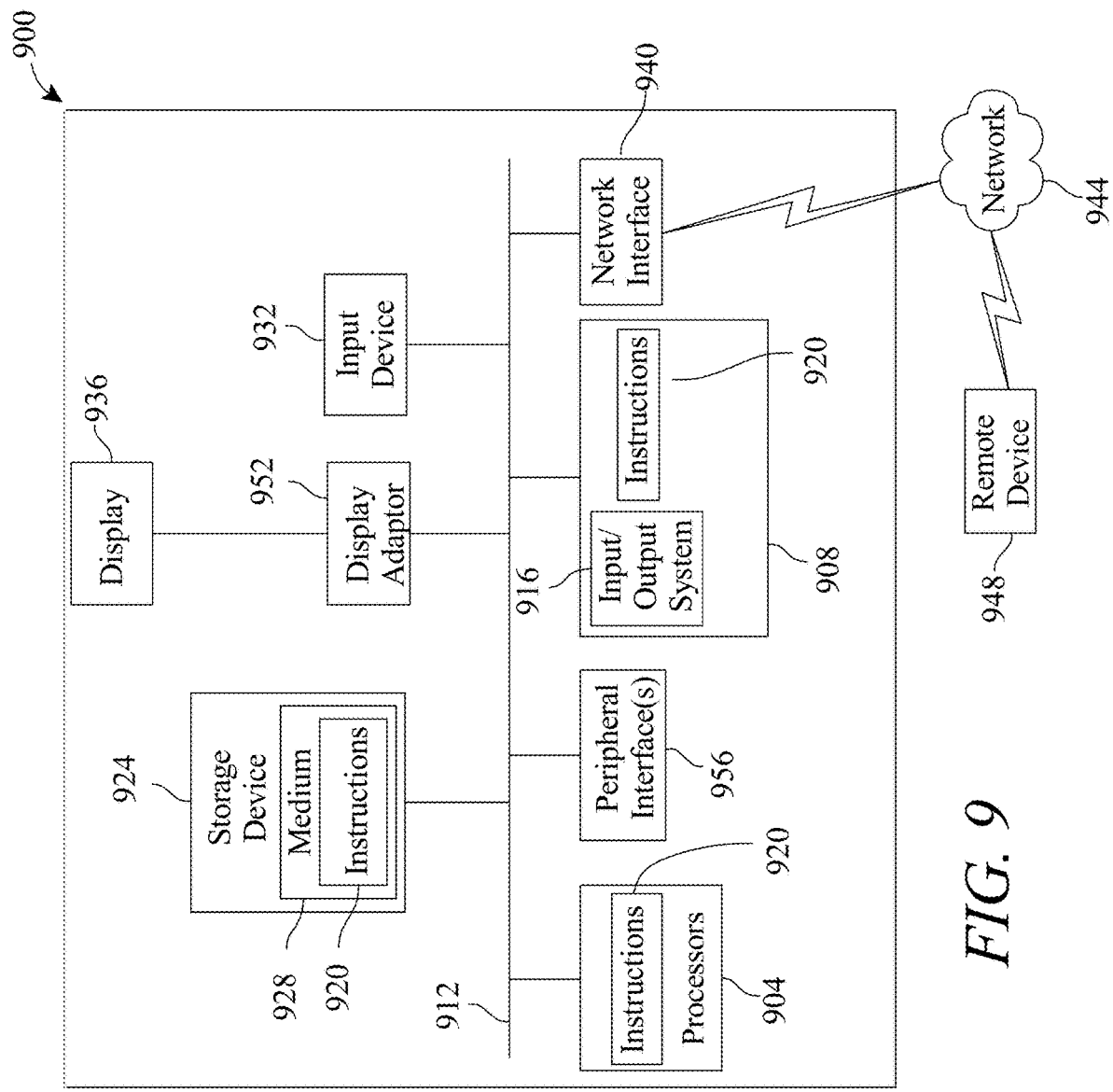
FIG. 9 is a block diagram of an exemplary embodiment of a computing system.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for disconnecting a battery from an electric aircraft, the system comprising:
    an electric aircraft comprising a plurality of vertical propulsors configured to propel the electric aircraft in an upward direction and at least one forward propulsor configured to propel the electric aircraft in a forward direction;
    a battery assembly electrically coupled to the electric aircraft, wherein the battery assembly is configured to include:
        at least a sensor, wherein the at least a sensor is configured to:
            measure specific forces on the electric aircraft;
            detect impacts to the electric aircraft; and
            detect a change in pitch, roll, and yaw of the electric aircraft;
        a connector attaching the battery assembly to the electric aircraft, wherein the connector rigidly attaches the battery assembly to the electric aircraft, and wherein the connector including an electrically actuating disconnection mechanism, wherein the electrically actuating disconnection mechanism includes a pin and a motor, wherein the motor is configured to position the pin in a locked position such that the battery assembly is coupled to the electric aircraft; and
        a control circuit electrically connected to the electrically actuating disconnection mechanism, the control circuit configured to:
            determine when at least one of the specific forces on the electric aircraft is above a threshold;
            detect, using the at least a sensor, an impact to the aircraft;
            detect, using the at least a sensor, the change in the pitch, roll, and yaw of the aircraft; and
            disconnect the connector from the electric aircraft using the electrically actuating disconnection mechanism that is configured to move the battery assembly from a locked position to an unlocked position as a function of the determination that at least one of the specific forces on the electric aircraft is above the threshold, the detection of impacts to the electric aircraft, and the change in the pitch, roll, and yaw of the electric aircraft.

2. The system of claim 1, wherein the electric aircraft is an electric vertical landing and takeoff aircraft (eVTOL).

3. The system of claim 1, wherein the sensor includes an inertial measurement unit (IMU).

4. The system of claim 1, wherein the electrically actuating disconnection mechanism includes a hook.

5. The system of claim 1, wherein the at least a sensor is configured to detect a cascading failure.

6. The system of claim 1, wherein the control circuit is further configured to disconnect the connector of the battery assembly from the electric aircraft at a specific threshold of force on the electric aircraft correlating to flight failure of the electric aircraft.

7. The system of claim 1, wherein the control circuit is further configured to disconnect the connector from the aircraft at a specific threshold of impact.

8. The system of claim 1, wherein the control circuit is further configured to preemptively disconnect the connector from the aircraft in anticipation of an event of impact.

9. The system of claim 8, wherein the event of impact includes a crash landing.

10. A method of disconnecting a battery assembly of an electric aircraft upon impact, comprising:
    detecting, by at least a sensor, incorporated in an electric aircraft comprising a plurality of vertical propulsors configured to propel the electric aircraft in an upward direction and at least one forward propulsor configured to propel the electric aircraft in a forward direction, an impact to the electric aircraft, wherein the electric aircraft includes a battery assembly electrically coupled to the electric aircraft, the battery assembly including:
        a connector attaching the battery assembly to the electric aircraft, wherein the connector rigidly attaches the battery assembly to the electric aircraft, wherein the connector includes an electrically actuating disconnection mechanism, wherein the electrically actuating disconnection mechanism includes a pin and a motor, wherein the motor is configured to position the pin in a locked position such that the battery assembly is coupled to the electric aircraft; and
        a control circuit electrically connected to the electrically actuating disconnection mechanism;
    detecting and measuring, by the at least a sensor, when at least one specific force on the electric aircraft is above a threshold;
    detecting and measuring, by the at least a sensor, a change in pitch, roll, and yaw of the electric aircraft; and
    disconnecting, using the electrically actuating mechanism, the connector from the electric aircraft by moving the battery assembly from a locked position to an unlocked position as a function of the determination that at least one of the specific forces on the electric aircraft is above the threshold, the detection of impacts to the electric aircraft, and the detection a change in pitch, roll, and yaw of the electric aircraft.

11. The method of claim 10, wherein the electric aircraft is an electric vertical landing and takeoff aircraft (eVTOL).

12. The method of claim 10, wherein the connector includes a hook.

13. The method of claim 10, wherein the at least a sensor includes an inertial measurement unit (IMU).

14. The method of claim 10, wherein the at least a sensor is further configured to detect a cascading failure.

15. The method of claim 10, wherein the control circuit is configured to disconnect the connector of the battery assembly at a specific threshold of impact of the electric aircraft.

16. The method of claim 10, wherein the control circuit is configured to preemptively disconnect the connector of the battery assembly in anticipation of an impact event.

17. The method of claim 10, wherein the battery assembly is further configured to include a plurality of connectors.

18. The method of claim 10, wherein the electric aircraft is configured to include two or more battery assemblies.

19. The system of claim 1, wherein the specific force comprises a linear acceleration of the electric aircraft.

20. The method of claim 10, wherein the specific force comprises a linear acceleration of the electric aircraft.

\* \* \* \* \*